(12) United States Patent
Haugen et al.

(10) Patent No.: US 8,990,194 B2
(45) Date of Patent: Mar. 24, 2015

(54) ADJUSTING CONTENT DELIVERY BASED ON USER SUBMISSIONS OF PHOTOGRAPHS

(71) Applicant: Google Inc., Mountain View, CA (US)

(72) Inventors: Frances B. Haugen, Mountain View, CA (US); Gregory M. Marra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 294 days.

(21) Appl. No.: 13/667,559

(22) Filed: Nov. 2, 2012

(65) Prior Publication Data

US 2014/0129625 A1   May 8, 2014

(51) Int. Cl.
  *G06F 7/00*      (2006.01)
  *G06F 17/30*     (2006.01)
  *G06F 15/16*     (2006.01)
  *G06Q 50/00*     (2012.01)
  *H04L 29/08*     (2006.01)
  *H04W 4/02*      (2009.01)
  (Continued)

(52) U.S. Cl.
  CPC .................. *H04W 4/08* (2013.01); *G06Q 50/01* (2013.01); *H04L 67/30* (2013.01); *H04W 4/02* (2013.01); *H04W 4/028* (2013.01); *H04W 4/18* (2013.01)
  USPC ........... 707/726; 707/708; 707/724; 707/725; 709/217; 709/218; 709/219

(58) Field of Classification Search
  USPC .......... 709/217, 218, 219, 227; 707/726, 708, 707/724, 725, 769, 723, 749, 722, 758; 705/26.62; 382/103; 345/589
  See application file for complete search history.

(56) References Cited

U.S. PATENT DOCUMENTS

| | | | |
|---|---|---|---|
| 2008/0222295 A1* | 9/2008 | Robinson et al. | ............. 709/227 |
| 2009/0177484 A1 | 7/2009 | Davis et al. | |
| 2010/0124378 A1 | 5/2010 | Das et al. | |

(Continued)

FOREIGN PATENT DOCUMENTS

| | | |
|---|---|---|
| KR | 10-2006-0029894 | 4/2006 |
| WO | 2009-070841 | 6/2009 |

OTHER PUBLICATIONS

International Search Report and Written Opinion in International Application No. PCT/US2013/068022, mailed Feb. 26, 2014, 10 pages.

(Continued)

*Primary Examiner* — Le H Luu
(74) *Attorney, Agent, or Firm* — Fish & Richardson P.C.

(57) ABSTRACT

Methods, and systems, including computer programs encoded on computer-readable storage mediums, including a method for adjusting content delivery based on user submissions. The method includes analyzing user submissions comprising photographs, the analyzing comprising: for each of the user submissions: identifying a time the user submission occurred; identifying objects represented in the photograph; determining a subject matter of the user submission based at least in part on the objects; determining a geographic location associated with the subject matter of the user submission; determining clusters of the user submissions, each user submission in a particular cluster being similar to each other user submission in the particular cluster based on the times the user submissions occurred, the subject matters of the user submissions, and the geographic locations associated with the user submissions; and adjusting content delivery to members of a network based on the determination of one or more of the clusters.

20 Claims, 5 Drawing Sheets

(51) Int. Cl.
*H04W 4/08* (2009.01)
*H04W 4/18* (2009.01)

(56) References Cited

U.S. PATENT DOCUMENTS

| | | | |
|---|---|---|---|
| 2011/0035406 A1* | 2/2011 | Petrou et al. | 707/769 |
| 2011/0093361 A1* | 4/2011 | Morales | 705/26.62 |
| 2011/0125735 A1* | 5/2011 | Petrou | 707/723 |
| 2011/0246485 A1* | 10/2011 | Rinearson et al. | 707/749 |
| 2011/0264649 A1* | 10/2011 | Hsiao et al. | 707/722 |
| 2012/0151391 A1 | 6/2012 | Bhatia et al. | |
| 2012/0294477 A1* | 11/2012 | Yang et al. | 382/103 |
| 2013/0135332 A1* | 5/2013 | Davis et al. | 345/589 |
| 2013/0166580 A1* | 6/2013 | Maharajh et al. | 707/758 |

OTHER PUBLICATIONS

Wikipedia, The Free Encyclopedia, "Google Goggles" (online) [Retrieved on May 17, 2013]. Retrieved from the internet: <http: en.wikipedia.org/wiki/Google_Goggles, 3 pages.

* cited by examiner

ADJUSTING CONTENT DELIVERY BASED ON USER SUBMISSIONS OF PHOTOGRAPHS

BACKGROUND

This specification relates to information presentation.

The Internet provides access to a wide variety of resources. For example, video and/or audio files, as well as web pages for particular subjects are accessible over the Internet. Further, online social networks are another resource that can be accessed over the Internet.

Online social networks permit users to post information and communicate with other people, such as their friends, family, and co-workers. Social network users can post, for example, information about themselves, their friends and events or activities about which they are interested or are otherwise aware. Given the number of social network users and the ease of posting information, e.g., through Internet-ready mobile devices, vast amounts of user submissions (e.g., posts) are posted daily on social networks. However, much of the information in such posts is of interest to only a small fraction of the social network user population as many posts are meant for consumption by friends or family of the poster, e.g., a post from a social network user about the social network user's dinner plans.

Information in the posts, and the intensity of such posts, can be indicative of trending topics or newsworthy events. However, given the vast amount of information posted and the local user audiences to which many posts are directed or are of interest, it can be challenging to distill the posts to identify those posts that relate to important, newsworthy or otherwise interesting events or topics that appeal or likely appeal to the general population of social network users or a larger population of Internet users, and not just to a particular group of users of a social network.

SUMMARY

In general, one aspect of the subject matter described in this specification can be implemented in methods that include analyzing user submissions to a network, wherein each of the user submissions comprise a photograph, the analyzing comprising: for each of the user submissions: identifying a time the user submission occurred; identifying one or more objects represented in the photograph from the user submission; determining a subject matter of the user submission based at least in part on the one or more objects identified from the user submission; determining a geographic location associated with the subject matter of the user submission based at least in part on content of the user submission; determining, by one or more processors, clusters of the user submissions, wherein each user submission in a particular cluster is similar to each other user submission in the particular cluster based at least in part on the times the user submissions occurred, the subject matters of the user submissions, and the geographic locations associated with the subject matter of the user submissions; and adjusting delivery of content to members of the network based on the determination of one or more of the clusters.

Other embodiments of this aspect can include corresponding systems, apparatus, and computer programs, configured to perform the actions of the methods, encoded on computer storage devices.

These and other embodiments can each optionally include one or more of the following features. The methods can also include identifying search queries for which responsive search results were selected that referenced the one or more objects and identifying one or more terms from the search queries as the subject matter of the user submission.

The methods can also include identifying clusters that have a number of user submissions that exceed a respective cluster threshold value and increasing a delivery volume of content to the network for content having a subject matter similar to that of the subject matter of the user submissions in the clusters that exceed their respective cluster threshold values. Each of the cluster threshold values can be based on the subject matter of user submissions in the respective cluster. Each of the cluster threshold values can alternatively or additionally be based on a volume of user submissions in the respective cluster and a time period during which those user submissions occurred.

The methods can also include determining the geographic location based at least in part on a geotag for the user submission. The methods can also include determining the geographic location based at least in part on geographic information for the one or more objects.

The methods can also include providing content including a headline with a link linking to an aggregation of user submissions from one or more of the determined clusters. The user submissions can be user posts to the network and the network can be an online social network.

Particular implementations of the subject matter described in this specification can be implemented to realize one or more of the following advantages. The subject matter of user photographic submissions (e.g., social network posts that include photographs and/or videos) to a network and the number of such submissions with common photographic subject matter can be used to determine important, newsworthy or otherwise interesting events or topics that likely appeal to a general population of network users. This leads to an additional layer of information gain.

In general, user submissions can be an indication of user interests in the subject matter of the submissions. Further, user photographic submissions are likely an even stronger indication of user interests as, beyond merely submitting textual content in a user submission, the users performed the additional step of taking photographs of the subject matter of interest and including the photographs in their submissions. Providers of content on the network (e.g., the social network providers) can leverage this strong indication of interest from user photographic submissions, for example, in determining the subject matter of content to distribute across the network. Further, the strong indications of interest from user photographic submissions can also be used to provide a better sematic understanding of search queries submitted to a search system.

More particularly, these content providers can focus on the subject matter of the photographs and the number of photographs with related or common subject matter to identify important, newsworthy or otherwise interesting events or topics (e.g., trending topics), rather than sifting through all user submissions, including text submissions that may not be the strongest indications of user interests. This reduces the processing burdens (e.g., system processing and bandwidth requirements) on the content providers in analyzing submissions as some or all of the text-only user submissions can be ignored or processed/analyzed at a lower priority. Additionally, as the user photographic submissions likely indicate a stronger user interest, selecting content based on the user photographic submissions to provide or distribute across the network will likely be more appealing or interesting to network users (or a broader group of network users) than content selected based only on text-only user submissions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various figures indicate like elements.

DETAILED DESCRIPTION

This description generally relates to analyzing user submissions, such as user posts of photographs and/or videos, to a social network in real-time or near real time to identify unusual, interesting and/or current events based on the subject matter and timing of the user submissions, the geographic location of such subject matter, the intensity or rate of relevant user submissions or a combination thereof. The identification of such subject matter/events can be used, for example, to determine which content (e.g., news feeds) may be of interest and be delivered to members of the social network.

More particularly, objects in photographs or videos in user submissions can be analyzed to identify the subject matter of the user submissions. For example, various object-based detection algorithms can be used to identify an object in a photograph in a user submission, and the subject matter of the identified object can be determined to be the subject matter of the user submission. The geographic location associated with a user submission/photograph can be determined through identification of objects (e.g., landmarks) in the photograph with known locations as well as through, for example, photograph geotags, IP address reconciliation, and other location determination processes.

As the user submissions are analyzed, clusters of user submissions with common subject matter are determined. The determination of clusters of user submissions may indicate important, newsworthy or otherwise interesting events related to the subject matters of the clusters. The determination of such clusters can be used to decide which content should be delivered to members in the social network, as described below.

Figure 1:
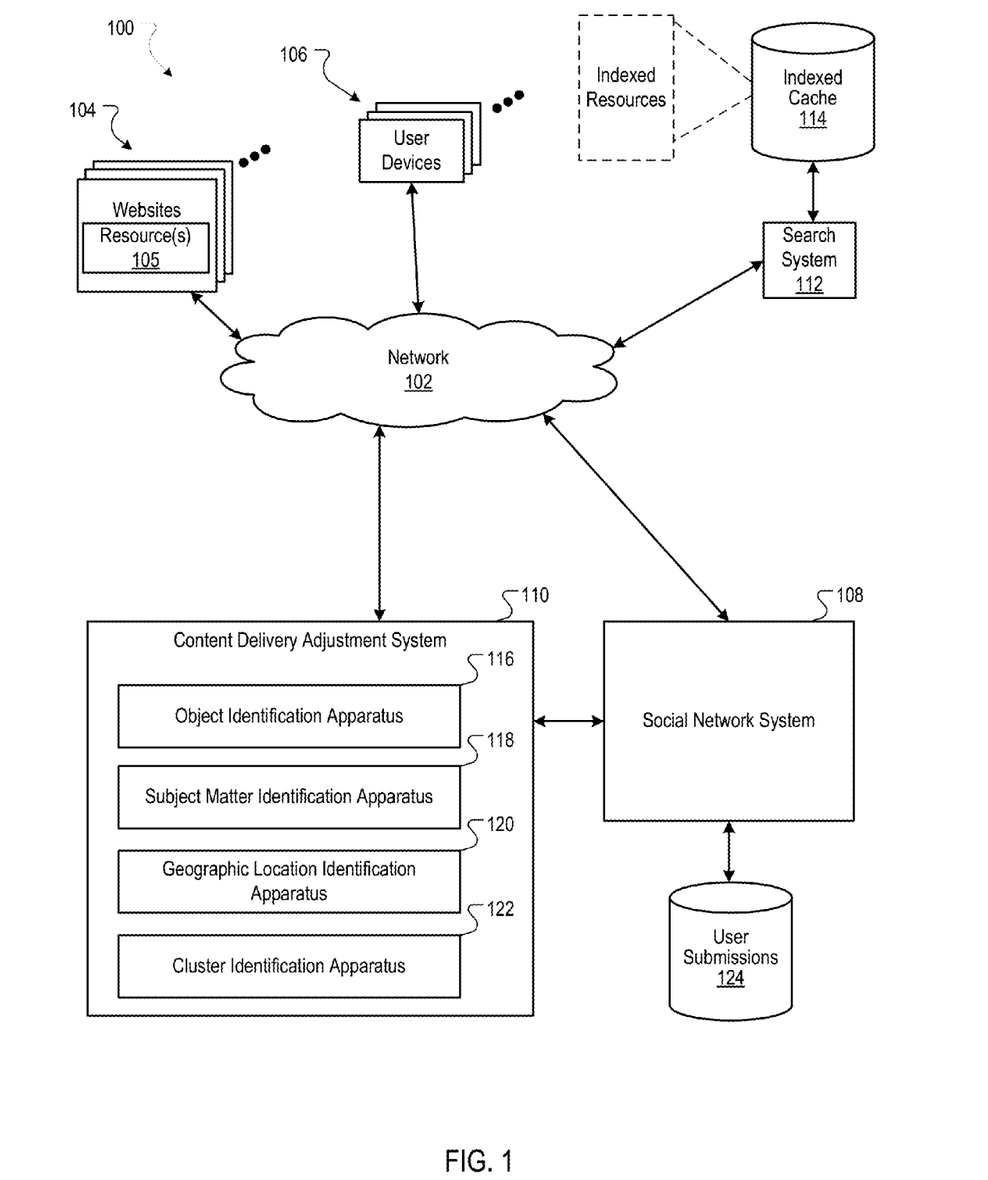
FIG. 1 is a block diagram of an example environment in which a content adjustment delivery system can be implemented.

FIG. 1 is a block diagram of an example environment in which a content adjustment delivery system 110 can be implemented. The example environment 100 includes a network 102, such as a local area network (LAN), a wide area network (WAN), the Internet, or a combination thereof. The network 102 can connect websites 104, user devices 106, the social network system 108, the content adjustment delivery system 110 and the search system 112. The example environment 100 may include many thousands of websites 104 and user devices 106.

A website 104 can be one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a publisher, which is an entity that controls, manages and/or owns the website 104.

A resource 105 can be any data that can be provided over the network 102. A resource 105 can be identified by a resource address that is associated with the resource 105. Resources include HTML pages, word processing documents, and portable document format (PDF) documents, images, photographs, video, and feed sources, to name only a few. The resources 105 can include content, such as words, phrases, images and sounds, that may include embedded information (such as meta-information in hyperlinks) and/or embedded instructions (such as scripts).

A user device 106 can be an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

To facilitate searching of the resource 105 and websites 104, the environment 100 can include a search system 112 that can identify the resources 105 by crawling and indexing the resources 105 provided by publishers on the websites 104. Data about the resources 105 can be indexed based on the resource 105 to which the data corresponds. The indexed and, optionally, cached copies of the resources 105 can be stored in an indexed cache 114.

User devices 106 can submit search queries to the search system 112 over the network 102. In response, the search system 112 can access the indexed cache 114 to identify resources 105 that are relevant to the search query. The search system 112 can identify the resources 105 in the form of search results and can return the search results to the user devices 106 in search results pages. A search result can be data generated by the search system 112 that identifies a resource 105 that is responsive to a particular search query, and includes a link to the resource 105. An example search result can include a web page title, a snippet of text or a portion of an image extracted from the web page, and the URL of the web page.

The social network system 108 can include a system through which an online social network can be implemented or otherwise subsist. As described above, an online social network can provide an environment through which users (e.g., social network members) can interact with other users. For example, users can use user devices 106 to access the social network through the social network system 108 and post information and communicate with other users, such as their friends, family, and co-workers. In some implementations, the social network system 108 includes one or more websites 104. In some implementations, users can create and maintain user member web pages (e.g., resources 105) on the social network system 108 to which users can, for example, post user submissions.

In some implementations, in additional to user member web pages, the social network system 108 can include, and provide access to, user community web pages and general content web pages. For example, such other web pages can include content such as news stories about current events, trending topics (e.g., most searched topics or subject matter), targeted content such as advertisements, summaries of recently posted user submissions, and the like. In some implementations, such content is displayed by user devices 106 as headlines on user member web pages.

As described above, users (e.g., social network members) can use user devices 106 to create content and submit posts to a social network service (e.g., the social network system 108 or another type of user-generated content service). For example, a social network member can take a photograph (or video) of an event of interest to that member and post the photograph or the photograph and a textual description of or comment about the photograph to the social network service so that the photograph or photograph and comment can be viewed by other members of the social network. In some implementations, the social network member can post the photograph to the member's profile web page so that other social network members that have a relationship (e.g., are friends) with the posting social network member can view the post by using a user device 106 to request access to the posting social network member's profile page.

As used herein a user submission is an item (e.g., photograph, video, textual comment, or some combination thereof) posted or provided to the social network system 108 for access by one or more user devices 106 therefrom. For example, a user submission can be or can be accessible through a resource 105 (e.g., a social network member's profile web page). In some implementations, user submissions can be stored (e.g., by the social network system 108) in a user submission data store 124. The user submissions can be stored and indexed according to, for example, the time the user submissions were posted, the subject matter of the post, the geographic location of the subject matter of the post, or any other factor.

In some implementations, content provided by or accessible from the websites 104, the social network system 108 and/or the search system 112 can be adjusted or otherwise affected by the content delivery adjustment system 110 based on the user submissions. For example, with respect to the social network system 108, the content delivery adjustment system 110 can determine (or adjust) which current events should be represented by headlines displayed on member web pages based on the number or submission rate of user submissions concerned with those current events. By way of another example, with respect to search results provided by the search system 112, the content delivery adjustment system 110 can provide indications to the search system 112 of topics or subject matter of recent interest based on the number or submission rate of user submissions concerned with those topics or subject matter. In turn, the search system 112 can use the indications to provide additional context and semantic meaning for submitted search queries to increase the likelihood responsive search results satisfy the submitting user's informational needs.

As described above, user submissions that include photographs or videos often provide a stronger indication of interest than do user submissions that only include textual content. Thus, in some implementations, the content delivery adjustment system 110 can analyze, at least in part, user submissions that include photographs in determining how to adjust content delivery. Content delivery adjustment and the operation of the object identification apparatus 116, the subject matter identification apparatus 118, the geographic location identification apparatus 120 and the cluster determination apparatus 122 of the content delivery adjustment system 110 are described with reference to FIGS. 2A, 2B and 2C.

Figure 2A:
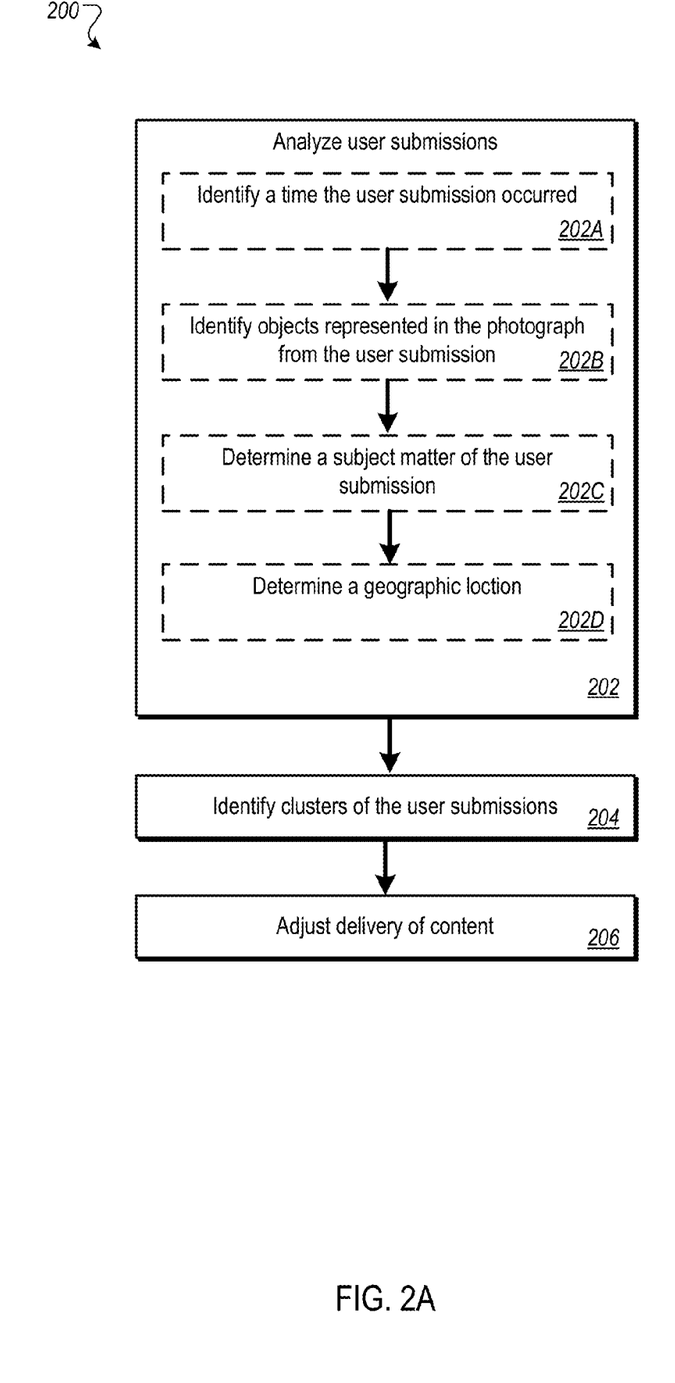
FIG. 2A is a flow diagram of an example process for adjusting the delivery of content.

With reference to FIG. 2A, which is a flow diagram of an example process for adjusting the delivery of content, the process 200 analyzes user submissions to a network (202). The network can be a network that includes a community of members that are a proper subset of members of another network. For example, the network can be members of a social network represented by a social network system 108 and the other network can be all users of the Internet.

In some implementations, the content delivery adjustment system 110 is communicatively coupled to the social network system 108. As such, the content delivery adjustment system 110 can receive the user submissions or otherwise accesses user submissions (e.g., from the user submission data store 124) and can analyze the user submissions to identify groups of user submissions with commonalities such as, for example, common subject matter (e.g., clusters of user submissions). For example, the user submissions can include photographs and, as described below, the content delivery adjustment system 110 can determine the commonalities based on the subject matter of the photographs.

The content delivery adjustment system 110 can use the identified clusters of user submissions to determine or adjust which content should be delivered, for example, through the social network system 108 to social network members. For example, an identified cluster may include ten thousand user submissions, posted during a five minute window, related to a tornado in Oklahoma City, Okla. Based on the submission rate of user submissions in the cluster (e.g., the number of user submissions received over a given time period), the content delivery adjustment system 110 can determine that a news feed about the tornado should be delivered to the social network members through the social network system 108.

In some implementations, the analysis of user submissions includes processes 202A-202D for each user submission. The process 200 identifies a time the user submission occurred (202A). In some implementations, the content delivery adjustment system 110 can identify a time the user submission occurred based on the time the user submission is posted to the social network system 108 or the time the photograph in the user submission was taken (e.g., as determined from metadata for the photograph). For example, the content delivery adjustment system 110 can identify a time the user submission occurred by "time stamping" the user submission with the time the user submission is posted to the social network system 108 based on the system clock of the server or other computing device in which the content delivery adjustment system 110 is implemented. In some implementations, the content delivery adjustment system 110 can access, through the social network system 108, user submissions from the user submission data store 124 and identify the times user submissions occurred from metadata associated with the user submissions.

The process 200 identifies one or more objects represented in the photograph from the user submission (202B). An object can be any visible or tangible element or thing captured or otherwise represented in a photograph. For example, an object can be a person, a building, a vehicle, or a weather event to name just a few. In some implementations, the object identification apparatus 116 can identify objects represented in the photograph included in the user submission. The object identification apparatus 116 can use various techniques to identify objects in a photograph such as scale invariant feature transform (SIFT), edge detection, interest point detection, pixel matching, and other appropriate image processing techniques. Process 202B is further described with reference to FIG. 2B, which is an example photograph 210 from a user submission.

Figure 2B:
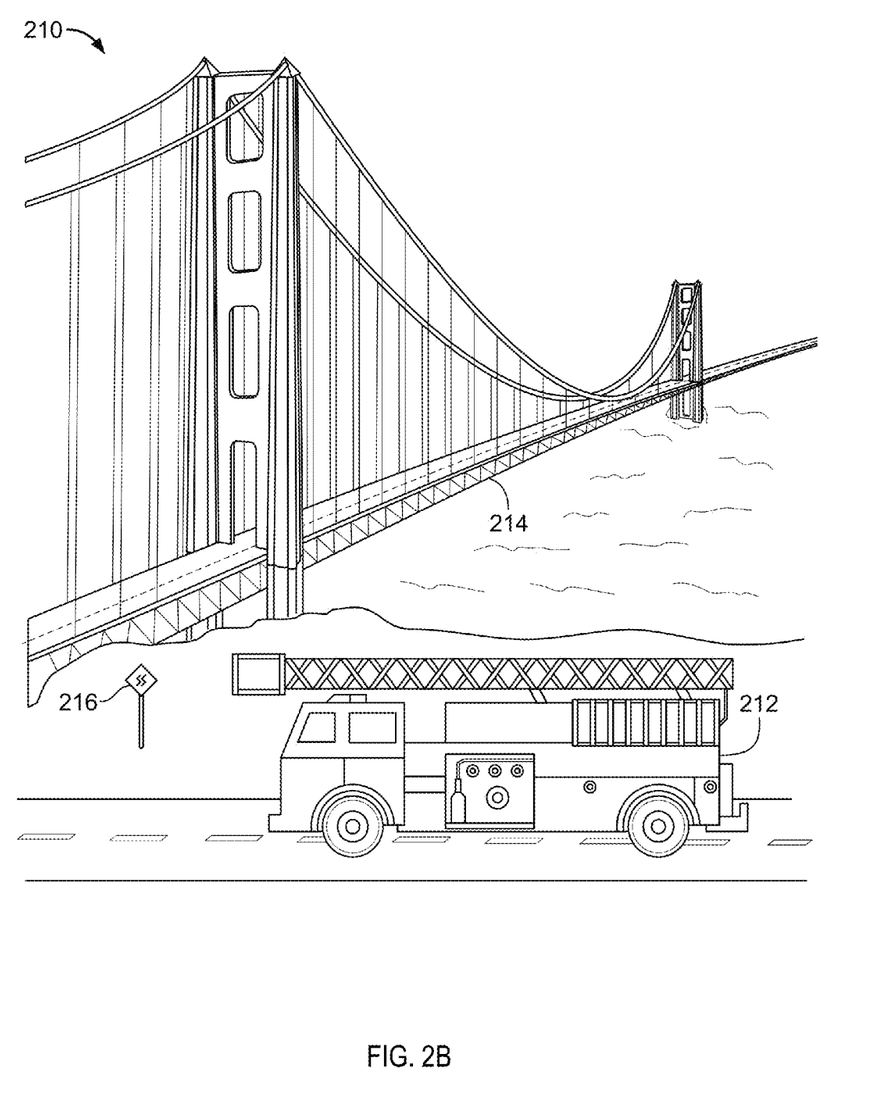
FIG. 2B is an example photograph from a user submission.

Photograph 210 includes a representation of a fire truck 212 and a traffic sign 216 in the foreground, and a representation of a bridge 214 in the background. As such, in response to a user submission including the photograph 210 being posted, the object identification apparatus 116, for example, can identify the fire truck 212 as a first object and the bridge 214 as a second object. For example, the object identification apparatus 116 can use a pixel or feature matching process to compare the pixels or features of the photograph 210 defining the fire truck 212 (a "pixel group") to the pixels or features of a photograph or image of a fire truck from a corpora of images with known subject matters (e.g., stored in an image data store accessible by the object identification apparatus 116) to identify the fire truck 212 as an object in the photograph 210. As used herein, a reference image can be an image or object, or image or object characteristic(s) or feature(s), having known subject matter, to which a photograph from a user submission can be compared. In some implementations, if the number of matched pixels or features between the reference image and the pixel group from the photograph (e.g., the fire truck 212) exceed a similarity threshold value, the object identification apparatus 116 can identify the pixel group as an object. For example, the similarity threshold value can be a 90% match or 90% similarity in pixels, a threshold cosine similarity value based on a feature vector comparison, or any other match or similarity values.

The process 200 determines a subject matter of the user submission based at least in part on the one or more objects from the user submission (202C). In some implementations, the subject matter identification apparatus 118 can determine a subject matter of the user submission based at least in part on an identified object from the photograph in the user submission (e.g., based on known images, common objects, and recognizable concepts such as logos). For example, the subject matter identification apparatus 118 can determine that the user submission including the photograph 210 has a subject matter related to fires and fire trucks based on the identification of the fire truck 212 as an object in the photograph 210.

The subject matter identification apparatus 118 can determine the subject matter of a user submission in numerous ways, such as from the metadata of images similar to the photograph in the user submission, from web pages that host images similar to the photograph, from search queries for which search results were selected that referenced images similar to the photograph, from textual content included in the user submission, or some combination thereof. As described above, in some implementations, the object identification apparatus 116 can identify a pixel group from a photograph in a user submission to be an object based on a matching process to a reference image (e.g., a pixel-to-pixel or feature-to-feature comparison process). In such implementations, each reference image stored in the reference image data store can be associated with one or more keywords (e.g., the metadata for each reference image includes a keyword for the reference image).

The subject matter identification apparatus 118 can extract the keyword from the metadata of the reference image to which the pixel group of the photograph is matched (or determined to be similar) and assigns the keyword from the matched reference image to the user submission as the subject matter of the user submission. For example, if the reference image to which the fire truck 212 is matched is associated with the keyword "fire" then the subject matter identification apparatus 118 can determine that the user submission including the photograph 210 has a subject matter of fire. Other techniques, beyond an image matching process can be used to identify objects in a photograph as being similar or the same as a reference image (e.g., cross correlation, scale invariant feature transform, categorizations in the same subject matter verticals). Regardless of how an object in a photograph is matched or determined to be similar to a reference image ("matched reference image"), the subject matter identification apparatus 118 can determine the subject matter of the user submission based on keywords associated with the matched reference image.

In some implementations, the subject matter identification apparatus 118 can use the matched reference image to query the search system 112 to determine or otherwise access keyword(s) on web pages which host the matched reference image (e.g., from the indexed cache 114). The subject matter identification apparatus 118 can assign these web page keywords as the subject matter for the respective user submission. Such web page keywords can be the titles of the respective web pages, headings on the respective web pages, annotations or captions for the matched reference images on the respective web pages, etc.

In some implementations, the indexed cache 114 can store web page keywords for reference images hosted on the web pages. As such, the subject matter identification apparatus 118 can request or otherwise accesses the relevant web page keywords from the indexed cache 114 or search system 112 based on the particular matched reference image. For example, the subject matter identification apparatus 118 can use the matched reference image for the fire truck 212 to request from the search system 112 the web page keywords from one or more web pages that host the matched reference image for the fire truck 212 and assign one or more of these web page keywords to be the subject matter of the user submission. As described below, the particular keywords assigned or determined to be the subject matter of the user submission can be based on keyword or term frequency in the web pages.

In some implementations, the subject matter identification apparatus 118 can communicate with and provide to the search system 112 a matched reference image. In return, the search system 112 can provide one or more search queries for which search results were selected that referenced (e.g., included links to) the matched reference image or, more generally, the object or pixel group in the photograph to which the matched reference image was matched.

The subject matter identification apparatus 118 can use one or more of the terms from the returned search queries (e.g., the search term appearing in the greatest number of returned search queries) as the term(s) that is assigned to be the subject matter of the corresponding user submission. For example, the subject matter identification apparatus 118 can provide the matched reference image for the fire truck 212 (e.g., a photograph of a fire truck that is the same make and model as the fire truck 212) to the search system 112. In turn, the search system 112 can parse search query logs storing data of past search queries and parses click logs storing data for past search query result selections to identify the search queries for which responsive search results, referencing or provided links linking to the matched reference image for the fire truck 212, were selected. The search system 112 can return these search queries to the subject matter identification apparatus 118.

The subject matter identification apparatus 118 can select one or more terms from the returned search queries to assign to be the subject matter of the user submission including relevant photograph. For example, if the returned search queries are "firefighting equipment," "fire," "fire trucks" and "how is a forest fire started," the subject matter identification apparatus 118 can select the search query term that appears in the greatest number of returned search queries—"fire." However, other selection methods can also be used such as selecting the term with the highest frequency of use across all returned search queries that is not an article of grammar or a preposition.

In some implementations, the subject matter identification apparatus 118 can determine the subject matter of user submissions based on textual content included in user submissions with textual content. More particularly, the subject matter identification apparatus 118 can analyze the textual content included in a user submission (e.g., by word frequency distributions, pattern recognition, tagging/annotation, information extraction, and/or other data mining techniques) to determine the subject matter of the user submission. For example, if the textual content included in the user submission with photograph 210 is "omg fire trucks!," the subject matter identification apparatus 118 can assign "fire trucks" or "fire" as the subject matter of the user submission based on an analysis of the textual content.

In some implementations, the subject matter identification apparatus 118 can analyze the textual content of numerous user submissions (e.g., posted within a particular time period such as the last ten minutes or originating from the same geographic region) to facilitate determinations of the subject matter(s) of the user submissions. By analyzing the textual content of numerous user submissions before determining the subject matter of any one of these particular user submissions, the subject matter identification apparatus 118 can identify commonalities or semantic trends among the user submissions to facilitate the determination of the subject matter for some or all of the user submissions. For example, if one hundred user submissions are posted during a five minute period and eighty-five of the user submissions include the term "fire" or "fire truck" then the subject matter identification apparatus 118 can determine with a high measure of confidence that the user submissions that include the term "fire" or "fire truck" have subject matters related to fires.

By analyzing a group of user submissions, the subject matter identification apparatus 118 can determine the subject matter(s) of such user submissions with a higher degree of confidence than by analyzing a single user submission in isolation. For example, if the textual content of a first user submission is "I can see a massive fire from the balcony of my hotel, which btw has amazing views of the water" and is accompanied by a photograph of the fire, it may be challenging to determine the user submission is primarily directed to the fire as the textual content also includes a reference to the hotel. However, if dozens of other user submissions are posted within two minutes in which the first user submission is posted and all clearly relate to a fire, then by analyzing all of these user submissions, the subject matter identification apparatus 118 can determine with a higher degree of confidence (e.g., determine as between fire and hotel) that the first user submission is primarily directed to a fire as all of the other user submissions are also directed to the fire.

More generally, the subject matter identification apparatus 118 can analyze a group of user submissions that are related (e.g., in time, geographic origin, posted by users with a commonality, etc.). If a threshold level of user submissions in the group are determined to have common subject matter then the subject matter identification apparatus 118 can use the common subject matter as an input to facilitate the determination of the subject matter for any user submissions in the group (or otherwise related) which have undiscerned, multiple or ambiguous subject matter.

In some implementations, the subject matter identification apparatus 118 can use any of the above described techniques, or any combination thereof, to determine the subject matter of a user submission.

The process 200 determines a geographic location associated with the subject matter of the user submission based at least in part on content of the user submission (202D). In some implementations, the geographic location identification apparatus 120 can determine the geographic location based on content of the user submission such as objects in the photograph of the user submission, metadata associated with the user submission, or both. For example, the geographic location identification apparatus 120 can cooperate with the object and subject matter identification apparatuses 116, 118 to identify objects that are landmarks (or otherwise provide meaningful location information) in the photographs and determine the geographic location based on the locations of the landmarks. Thus, for example, the geographic location identification apparatus 120 can identify the bridge 214 in photograph 210 as the Golden Gate Bridge near San Francisco, Calif. and, therefore, determine that the geographic location associated with the subject matter of the corresponding user submission (e.g., fire) is or is proximate San Francisco, Calif.

As described above, in some implementations, the geographic location identification apparatus 120 can determine the geographic location based on metadata associated with the user submission. For example, the metadata can be EXIF data for the photograph specifying the location the photograph was taken. The geographic location identification apparatus 120 can determine the geographic location for the user submission to be the same as the location specified in the EXIF data.

In some implementations, the geographic location identification apparatus 120 can determine the geographic location based on location information for the user submission itself. For example, user submissions can be geotagged with the location of the user device 106 posting the user submission (e.g., as determined by the global positioning system of the user device 106). The geographic location identification apparatus 120 can use this geotag information to determine the geographic location. For example, the geographic location identification apparatus 120 can determine that the geographic location associated with the subject matter of the corresponding user submission to be the same as the location specified in the geotag information of the user submission.

In some implementations, the geographic location identification apparatus 120 can determine the geographic location based on the IP address of the user device 106 posting the user submission. For example, the geographic location identification apparatus 120 can access location information for the IP address of the user device 106 posting the user submission from an IP address/location lookup data store and determine the geographic location to be the same as the location associated with the IP address of the posting user device 106. The geographic location identification apparatus 120 can use any one of the above described techniques, or any combination thereof, to determine the geographic location.

As described above, the process 200 analyzes user submissions to, in part, identify the times user submissions were posted, and determine the subject matters of the user submissions and the geographic locations associated with such subject matters. If the frequency of user submissions having a similar subject matter and geographic location increases over a given time interval, it is likely that an event of some importance related to such subject matter and geographic location has occurred. As such, it is desirable to provide information related to such an event to members of the social network. The identification of such events is described below.

The process 200 determines clusters of the user submissions (204). Each user submission in a particular cluster is similar to each other user submission in the particular cluster based at least in part on the times the user submissions occurred, the subject matters of the user submissions, the geographic locations associated with the subject matter of the user submissions or some combination thereof. Thus a cluster can be a grouping of user submissions related in at least one of time, subject matter or geographic location. For example, a cluster can be composed of user submissions that have the same or similar subject matters and geographic locations that were posted with in a particular three minute window.

User submissions can be determined to have similar or related subject matters, for example, if the subject matters of the user submissions are classified in the same vertical/subject matter categories or if the user submissions include the same or related (e.g., semantically related) textual content (e.g., keywords) or image content (e.g., as determined through image matching techniques). User submissions can be determined to be similar or related in time, for example, if the user submissions were submitted within a specified time period relative to each other or within a specified time period relative to a particular day or time during the day. User submissions can be determined to be similar or related in geographic location, for example, if the user submissions were submitted at or within or include content associated with a particular geographic region (e.g., the user submissions were submitted by users in California or the user submissions include photographs of the Golden Gate Bridge). In some implementations, the cluster determination apparatus 122 can determine clusters of the user submissions.

The cluster determination apparatus 122 can determine clusters based on, for example, various techniques such as k-means clustering, hierarchical clustering or density-based clustering. The determination of clusters is described with reference to FIG. 2C, which is an example diagram 280 of user submission clusters. The diagram 280 includes numerous designators 281 each representing a particular user submission received during a specified time period (e.g. one hour). The diagram 280 represents a two-dimensional space with the y-axis representing the geographic location of the subject matter of a user submission and the x-axis representing the subject matter of the user submission. In a three-dimensional representation of user submissions, the z-axis would, for example, represent the time the user submission was posted.

Figure 2C:
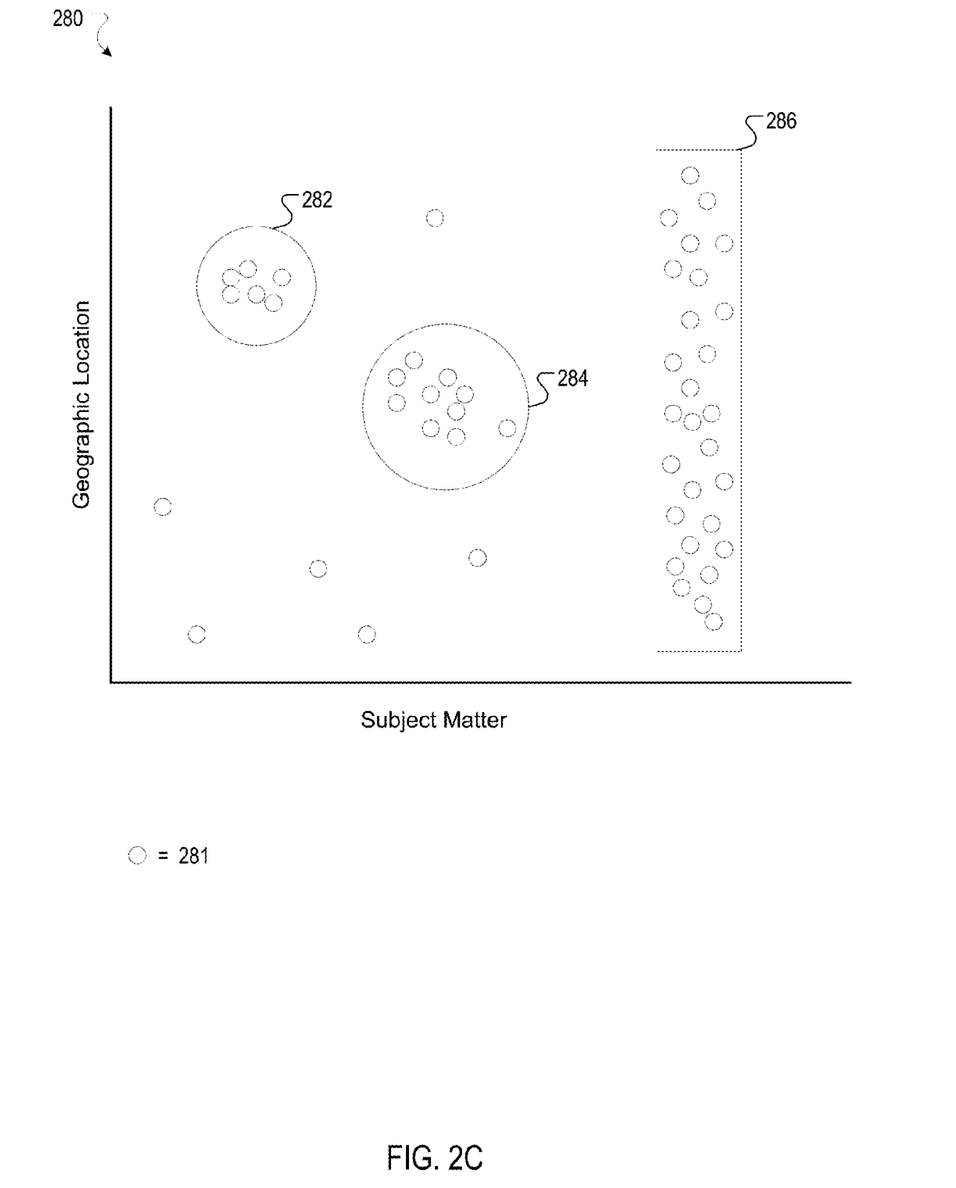
FIG. 2C is an example diagram of user submission clusters.

With respect to the diagram 280, the cluster determination apparatus 122 determines or identifies, for example, three clusters of user submissions: clusters 282, 284 and 286. The user submissions in the cluster 282 are similar in both subject matter (e.g., fire) and geographic location (e.g., San Francisco) as the user submissions in the cluster are concentrated in a relatively small region (in terms of subject matter and geographic location). In other words the variation of subject matter and geographic location for user submissions in the cluster across the x- and y-axes is within some specified range defining the cluster.

Likewise, the user submissions in the cluster 284 are similar in both subject matter (e.g., the World Cup finals) and geographic location (e.g., Chicago). However, clusters can also be composed of user submissions related in only subject matter as the nature of the corresponding event may be geographically agnostic or distributed. For example, the user submissions in the cluster 286 are geographically distributed (e.g., dissimilar) but similar in terms of subject matter as indicated by the low variance in subject matter (e.g., small range across the x-axis) and high variance in geographic location (e.g., large range across the y-axis). Once such example, of a cluster of user submissions having a similar subject matter but being geographically distributed are user submissions of presidential election results from across the country on election day.

In some implementations, the cluster determination apparatus 122 can identify clusters that have a number of related user submissions (e.g., related in subject matter, time, geographic location or any combination thereof) that exceed a cluster threshold value for a cluster of such related user submissions. A cluster threshold value can be a threshold measure of user submissions which must be exceeded for the related user submissions to constitute a cluster. A cluster threshold value can be based on, for example, the number of related user submissions or on the number or volume of user submissions posted over a specified interval (e.g., user submission rate). For example, for a particular cluster with user submissions having a subject matter related to a fire in San Francisco, the cluster threshold value is two hundred related user submissions per hour. As such, the cluster determination apparatus 122 can identify a group of user submissions related to a fire in San Francisco as a cluster in response to determining there are at least two hundred such user submissions posted during a one hour interval.

The level or value of a cluster threshold can be set to reduce the likelihood that user submissions related to subject matter which is of interest to only a small fraction of social network members are determined to be a cluster or are used for determining which content or the volume of such content to deliver to, for example, members of a social network. As described below, as content for distribution across the social network can be selected based on determined clusters or on a particular group of clusters, subject matter that is of interest to only a small fraction of the social network members is likely not a good candidate for distribution. Thus the cluster determination apparatus 122 or a social network administrator can set a cluster threshold to a value that reduces the likelihood of clusters being identified or determined based on a limited number of user submissions. This, in turn, reduces the likelihood of distribution of content related to such user submissions to the general social network audience.

As described above, the diagram 280 is based on user submissions received during a specified time period. The cluster determination apparatus 122 can vary the time window across which clusters of user submissions are determined. In some implementations, the cluster determination apparatus 122 can vary the time window based on the type of subject matter. For example, some subject matter is associated with events that occur over a relatively brief time period (e.g., emergency events, such as a building fire or earthquake) while other subject matter is associated with events that occur over a relatively long time period (e.g., gradual seasonal events, such as fall foliage).

Thus for subject matter associated with events that occur over a short time period, it is expected that the intensity of relevant user submissions (e.g., the number of submissions per unit time) posted will be relatively high. Accordingly, for such subject matters, to minimize the likelihood that the cluster determination apparatus 122 will miss such events/groups of user submission, in some implementations, the cluster determination apparatus 122 can analyze the user submissions for such clusters at frequent intervals. Such frequent looking consumes more system resources than looking for clusters at less frequent intervals.

Likewise, for subject matter associated with events that occur over a long time period, it is expected that the intensity of relevant user submissions posted will be lower than that of user submissions related to events that occur over a short time period. Accordingly, for such longer occurring events, in some implementations, the cluster determination apparatus 122 can analyze the user submissions for corresponding clusters at intervals less frequent than that for clusters of user submissions related to events that occur over a short time period. This, in turn, reduces the burden on system resources as compared to the frequent intervals for clusters of user submissions related to events that occur over a short time period.

Given the relative user submission intensity levels described above for subject matters associated with events that occur over short or long time periods, in some implementations, the cluster determination apparatus 122 can set a cluster threshold value based on the expected intensity levels. The expected intensity levels can be, for example, based on historical measures. As such, the cluster determination apparatus 122 can set the cluster threshold values for clusters of user submissions related to events that occur over a short time period at an intensity level higher than those for clusters of user submissions related to events that occur over a long time period. For example, as user submissions having a subject matter associated with fall foliage events will likely be posted at relatively low intensity levels given the gradual foliage change in any one geographic area and the different timing of fall foliage events in different geographic areas, the cluster determination apparatus 122 will set the cluster threshold value at a lower level than the cluster threshold value for a cluster of user submissions related to an event that occurs over a short time period and for which a high intensity level of user submissions is expected.

In some implementations, the cluster determination apparatus 122 can also vary the frequency with which it looks for clusters of user submissions with a particular subject matter based on historical occurrences of user submissions with that particular subject matter. For example, the cluster determination apparatus 122 can access a database of past user submissions and determine when particular clusters were identified in the past. Thus if the cluster determination apparatus 122 identified a cluster associated with fall foliage last October then the cluster determination apparatus 122 can start looking for a cluster of fall foliage-related user submissions this October with a frequency greater than it did, for example, in June given the previous identification of the cluster last October.

Given that a determined cluster is likely a good indicator of an interest of a set of social network members, the cluster determination apparatus 122 can use the determined clusters to adjust or select content to distribute across the social network to social network members as described below.

In some implementations, the cluster determination apparatus 122 analyzes (or further analyzes) the user submissions to identify clusters of "unusual" events. An unusual event is an event that deviates (e.g., by a specified threshold deviation) from a baseline or norm for a category of events in which the event of interest is categorized. An event or the user submission about the event is categorized in one or more particular categories based on similarities between the subject matter of the event and the subject matter of the particular category or categories. For example, for a category of user submissions about fire truck related events, a majority of the user submissions include a photograph of a fire truck at a fire station (e.g., the norm or baseline for the category). Thus a user submission that includes a photograph of a fire truck at a bridge is a rarer occurrence than a user submission that includes a photograph of a fire truck at a fire station (e.g., it deviates from the norm of user submissions that include photographs of fire trucks). Such rarity or deviation from a norm can signify an unusual or abnormal event.

In some implementations, the cluster determination apparatus 122 identifies clusters of unusual user submissions (e.g., user submissions that include unusual or abnormal events). For example, treating the user submissions as a time series, the cluster determination apparatus 122 can use various statistical techniques such as, for example, a least squares analysis to identify abnormal or unusual user submissions. Thus the cluster determination apparatus 122 can analyze a group of user submissions submitted during a particular time frame (e.g., a time series of user submissions) and, for example, based on a statistical analysis of the user submissions, identify clusters of unusual user submissions. For example, a cluster of unusual user submissions including photographs of a fire truck at a bridge can be identified.

The process 200 adjusts the delivery of content to members of the second network based on the determination of one or more of the clusters (206). For example, if a determined cluster relates to a fire in San Francisco then the cluster determination apparatus 122 can generate a headline titled "Fire in San Francisco" and distributes the content across the social network. The headline can, for example, include a link linking to an album or an aggregation of user submissions from the cluster. In another example, the cluster determination apparatus 122 can select a news feed about the fire and distribute the news feed or show the fire as a trending topic. As the clusters can be determined in a real time or near real time process, the cluster determination apparatus 122 can distribute or provide content relevant to the subject matter of the determined cluster in a timely manner with respect to the occurrence of the associated event.

More generally, the content delivery adjustment system 110 can adjust the delivery of content based on the user submission rate for a cluster of user submissions. For example, the content delivery adjustment system 110 can increase a delivery volume of content (e.g., the number of content items delivered or the rate which the content items are delivered) having subject matter similar to that of the subject matter of the user submissions in the clusters that exceed their respective cluster threshold values (e.g., the clusters determined from the process 204).

In some implementations, the cluster determination apparatus 122 can, for example, provide the determined clusters to the search system 112 and the search system 112 can use the subject matter associated with the determined clusters to provide semantic context for search queries to increase the relevancy of search results returned in response to the search queries. For example, if a slightly ambiguous search query is received, the search system 112 can use the subject matter associated with the received clusters (and the context that such subject matter is currently trending) to resolve or help resolve the ambiguity in the search query.

Although the above description has focused on user submissions with photographs, the methods and processes described herein are equally applicable to user submissions that include audio clips, audio/video clips, drawings and the like. For example, the content adjustment delivery system 110 can use various audio analysis techniques to determine the subject matter of an audio clip and assign the extracted subject matter to be the subject matter of the corresponding user submission. Likewise, the content adjustment delivery system 110 can use various image and audio analysis techniques to determine the subject matter of an audio/video clip and assign the extracted subject matter to be the subject matter of the corresponding user submission.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 3:
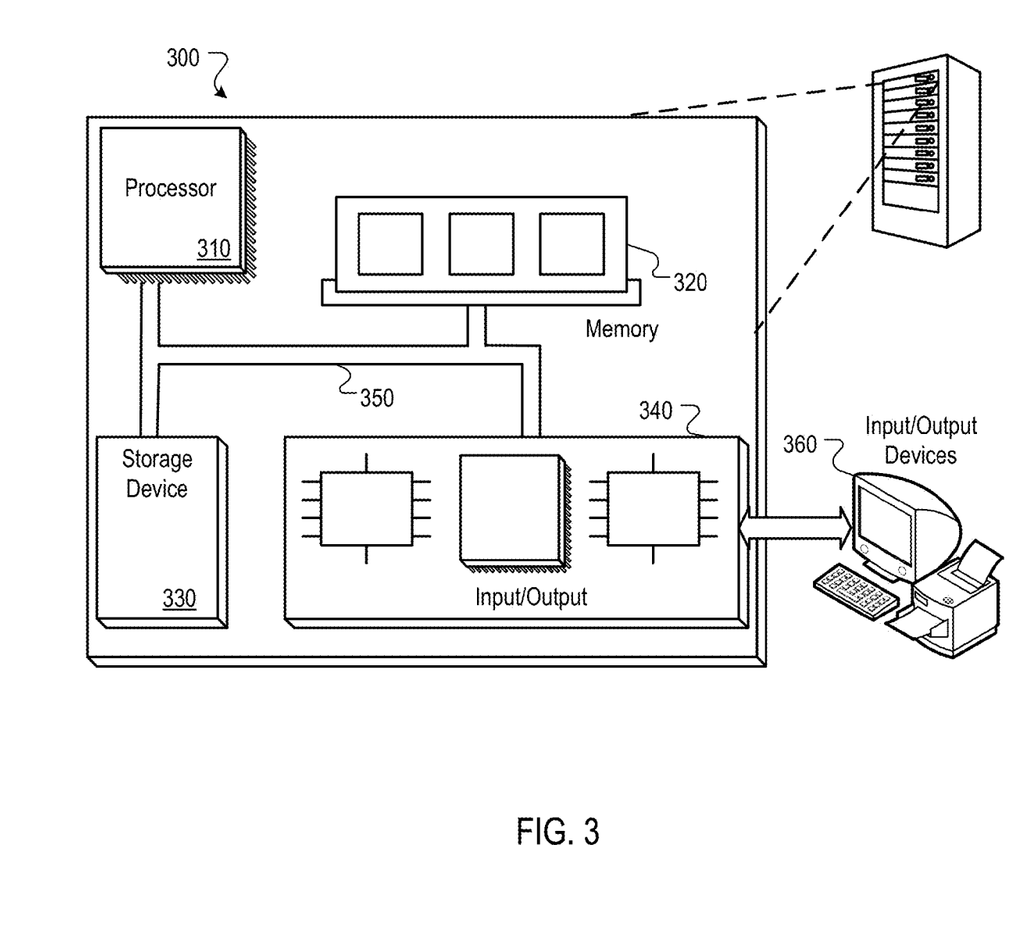
FIG. 3 is a block diagram of a programmable processing system.

An example of one such type of computer is shown in FIG. 3, which shows a block diagram of a programmable processing system (system). The system 300 that can be utilized to implement the systems and methods described herein. The architecture of the system 300 can, for example, be used to implement a computer client, a computer server, or some other computer device.

The system 300 includes a processor 310, a memory 320, a storage device 330, and an input/output device 340. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 can, for example, include a hard disk device, an optical disk device, or some other large capacity storage device.

The input/output device 340 provides input/output operations for the system 300. In one implementation, the input/output device 340 can include one or more of a network interface device, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 360.

While this specification contains many specific implementation details, these should not be construed as limitations on the scope of any implementations or of what may be claimed, but rather as descriptions of features specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
analyzing user posts to an online social network, wherein each of the user posts is from a member of the social network and comprises a photograph, the analyzing comprising:
for each of the user posts:
identifying a time the user post was posted;
identifying one or more objects represented in the photograph from the user post based on content of the user post;
determining a subject matter of the user post based at least in part on a subject matter of the one or more objects identified from the user post;
determining a geographic location associated with the user post based at least in part on a geographic location associated with the one or more objects;
determining, by one or more processors, clusters of the user posts, wherein each user post in a particular cluster is similar to each other user post in the particular cluster based at least in part on the times the user posts were posted, the subject matters of the user posts, and the geographic locations associated with the user posts; and
determining which content to deliver to members of the social network based on the subject matters of the user posts from one or more of the clusters.

2. A computer-implemented method, comprising:
analyzing user submissions to a network, wherein each of the user submissions comprise a photograph, the analyzing comprising:
for each of the user submissions:
identifying a time the user submission occurred;
identifying one or more objects represented in the photograph from the user submission;
determining a subject matter of the user submission based at least in part on the one or more objects identified from the user submission;
determining a geographic location associated with the subject matter of the user submission based at least in part on content of the user submission;
determining, by one or more processors, clusters of the user submissions, wherein each user submission in a particular cluster is similar to each other user submission in the particular cluster based at least in part on the times the user submissions occurred, the subject matters of the user submissions, and the geographic locations associated with the subject matter of the user submissions; and
adjusting delivery of content to members of the network based on the determination of one or more of the clusters.

3. The method of claim 2, wherein the user submissions are user posts to the network.

4. The method of claim 2, wherein:
determining a subject matter of the user submission comprises:
identifying search queries for which responsive search results were selected that referenced the one or more objects; and
identifying one or more terms from the search queries as the subject matter of the user submission.

5. The method of claim 2, further comprising:
identifying clusters that have a number of user submissions that exceed a respective cluster threshold value; and
wherein adjusting delivery of content comprises increasing a delivery volume of content to the network for content having a subject matter similar to that of the subject matter of the user submissions in the clusters that exceed their respective cluster threshold values.

6. The method of claim 5, wherein each of the cluster threshold values is based on the subject matter of user submissions in the respective cluster.

7. The method of claim 5, wherein each of the cluster threshold values is based on a volume of user submissions in the respective cluster and a time period during which those user submissions occurred.

8. The method of claim 2, wherein determining a geographic location associated with the subject matter of the user submission comprises determining the geographic location based at least in part on a geotag for the user submission.

9. The method of claim 2, wherein determining a geographic location associated with the subject matter of the user submission comprises determining the geographic location based at least in part on geographic information for the one or more objects.

10. The method of claim 2, wherein adjusting delivery of content comprises providing content including a headline with a link linking to an aggregation of user submissions from one or more of the determined clusters.

11. A system comprising:
one or more data processors; and
instructions stored on a computer readable storage medium that when executed by the one or more data processors cause the one or more data processors to perform operations comprising:
analyzing user submissions to a network, wherein each of the user submissions comprise a photograph, the analyzing comprising:
for each of the user submissions:
identifying a time the user submission occurred;
identifying one or more objects represented in the photograph from the user submission;
determining a subject matter of the user submission based at least in part on the one or more objects identified from the user submission;
determining a geographic location associated with the subject matter of the user submission based at least in part on content of the user submission;
determining clusters of the user submissions, wherein each user submission in a particular cluster is similar to each other user submission in the particular cluster based at least in part on the times the user submissions occurred, the subject matters of the user submissions, and the geographic locations associated with the subject matter of the user submissions; and
adjusting delivery of content to members of the network based on the determination of one or more of the clusters.

12. The system of claim 11, wherein the user submissions are user posts to the network.

13. The system of claim 11, wherein:
determining a subject matter of the user submission comprises:
identifying search queries for which responsive search results were selected that referenced the one or more objects; and
identifying one or more terms from the search queries as the subject matter of the user submission.

14. The system of claim 11, further comprising:
identifying clusters that have a number of user submissions that exceed a respective cluster threshold value; and
wherein adjusting delivery of content comprises increasing a delivery volume of content to the network for content having a subject matter similar to that of the subject matter of the user submissions in the clusters that exceed their respective cluster threshold values.

15. The system of claim 14, wherein each of the cluster threshold values is based on the subject matter of user submissions in the respective cluster.

16. The system of claim 14, wherein each of the cluster threshold values is based on a volume of user submissions in the respective cluster and a time period during which those user submissions occurred.

17. The system of claim 11, wherein determining a geographic location associated with the subject matter of the user submission comprises determining the geographic location based at least in part on a geotag for the user submission.

18. The system of claim 11, wherein determining a geographic location associated with the subject matter of the user submission comprises determining the geographic location based at least in part on geographic information for the one or more objects.

19. The system of claim 11, wherein adjusting delivery of content comprises providing content including a headline with a link linking to an aggregation of user submissions from one or more of the determined clusters.

20. The system of claim 11, wherein the network is an online social network.

* * * * *